United States Patent
Doutre et al.

(10) Patent No.: US 10,916,003 B2
(45) Date of Patent: Feb. 9, 2021

(54) IMAGE QUALITY SCORER MACHINE

(71) Applicant: Uber Technologies, Inc., San Francisco, CA (US)

(72) Inventors: Thibault Doutre, San Francisco, CA (US); David Gregory Purdy, Millbrae, CA (US); Jason Byron Yosinski, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 318 days.

(21) Appl. No.: 15/926,038

(22) Filed: Mar. 20, 2018

(65) Prior Publication Data

US 2019/0295240 A1    Sep. 26, 2019

(51) Int. Cl.
*G06T 7/00* (2017.01)
*G06N 3/08* (2006.01)
(Continued)

(52) U.S. Cl.
CPC ........ *G06T 7/0002* (2013.01); *G06K 9/00228* (2013.01); *G06K 9/00288* (2013.01);
(Continued)

(58) Field of Classification Search
CPC ..................... G06T 7/0002; G06T 7/97; G06T 2207/30168; G06K 9/6215; G06K 9/627;
(Continued)

(56) References Cited

U.S. PATENT DOCUMENTS

| | | |
|---|---|---|
| 2008/0252412 A1 | 10/2008 | Larsson et al. |
| 2011/0150280 A1* | 6/2011 | Tsuji ........................ G06T 7/248 382/103 |

(Continued)

FOREIGN PATENT DOCUMENTS

| | | |
|---|---|---|
| CN | 107832802 | 3/2018 |
| CN | 108090902 | 5/2018 |

(Continued)

OTHER PUBLICATIONS

"International Application Serial No. PCT US2019 021126, International Preliminary Report on Patentability dated Feb. 20, 2020", 6 pgs.

(Continued)

*Primary Examiner* — Xuemei G Chen
(74) *Attorney, Agent, or Firm* — Schwegman Lundberg & Woessner, P.A.

(57) ABSTRACT

An image quality scorer machine accesses a candidate image to be analyzed for visual quality. The image quality scorer machine generates a visual quality score of the candidate image by first generating a prediction of a similarity score for the candidate image. The predicted similarly score of the candidate image may be generated by a process including inputting the candidate image into a neural network that has been trained to detect a set of image features in the candidate image and then to generate a corresponding predicted similarity score based on degrees to which the image features in the set are present in the candidate image. The image quality scorer machine derives the visual quality score based on the predicted similarity score outputted by the neural network. Accordingly, the image quality score machine may provide or store the generated visual quality score of candidate image for subsequent usage.

15 Claims, 7 Drawing Sheets

(51) Int. Cl.
*G06K 9/00* (2006.01)
*G06K 9/62* (2006.01)

(52) U.S. Cl.
CPC ........... *G06K 9/627* (2013.01); *G06K 9/6215* (2013.01); *G06N 3/08* (2013.01); *G06T 7/97* (2017.01); *G06T 2207/30168* (2013.01)

(58) Field of Classification Search
CPC ... G06K 9/00288; G06K 9/00228; G06N 3/08
See application file for complete search history.

(56) References Cited

U.S. PATENT DOCUMENTS

| | | | |
|---|---|---|---|
| 2016/0300120 A1* | 10/2016 | Haas | G06K 9/6206 |
| 2016/0358321 A1* | 12/2016 | Xu | G06K 9/036 |
| 2018/0068218 A1 | 3/2018 | Yoo et al. | |
| 2018/0211164 A1* | 7/2018 | Bazrafkan | G06N 3/088 |
| 2018/0373924 A1* | 12/2018 | Yoo | G06F 21/32 |

FOREIGN PATENT DOCUMENTS

| | | |
|---|---|---|
| CN | 108596890 | 9/2018 |
| WO | 2016197026 | 12/2016 |
| WO | 2019182759 | 9/2019 |

OTHER PUBLICATIONS

"International Application Serial No. PCT US2019 021126, International Preliminary Report on Patentability dated Mar. 4, 2020", 6 pgs.

"International Application No. PCT US2019 021126, Invitation to Pay Additional Fees dated Jun. 4, 2019", 11 pgs.

"International Application Serial No. PCT US2019 021126, International Search Report dated Aug. 12, 2019", 6 pgs.

"International Application Serial No. PCT US2019 021126, Written Opinion dated Aug. 12, 2019", 10 pgs.

* cited by examiner

IMAGE QUALITY SCORER MACHINE

TECHNICAL FIELD

The subject matter disclosed herein generally relates to the technical field of special-purpose machines that perform or otherwise facilitate analysis of media content, such as images, including software-configured computerized variants of such special-purpose machines and improvements to such variants, and to the technologies by which such special-purpose machines become improved compared to other special-purpose machines that also perform or otherwise facilitate analysis of media content. Specifically, the present disclosure addresses systems and methods to provide a quality scorer machine that may be configured as an image quality scorer machine.

BACKGROUND

A machine may be configured to automatically analyze media content (e.g., image content, video content, or audio content) in various ways and generate one or more results based on such analysis. For example, a machine may be configured to determine the average brightness of all pixels within an image and generate a resulting output that indicates the average brightness of the image. In some cases, the machine may be configured to interact with one or more users by accepting submissions of media content for analysis and responding to such submissions with one or more generated results, any one or more of which may be caused by the machine to be presented to a user by the machine itself, by a device of the user, or by any suitable combination thereof.

BRIEF DESCRIPTION OF THE DRAWINGS

Some embodiments are illustrated by way of example and not limitation in the figures of the accompanying drawings.

DETAILED DESCRIPTION

Example methods (e.g., algorithms) provide improved ways to automatically assess visual or acoustic quality of media content (e.g., images, videos, or audio content), and example systems (e.g., special-purpose machines configured by special-purpose software) are configured to perform or otherwise facilitate such improved ways to automatically assess visual or acoustic quality of media content. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine is configured to perform an automatic quality analysis of media content (e.g., an image, a video, or an audio clip). For clarity, much of the discussion herein focuses on an improved image quality scorer machine that automatically analyzes an image for visual quality and generates a corresponding visual quality score that characterizes the visual quality of the image. However, analogous methodologies and systems provide an improved audio quality scorer machine that automatically analyzes an audio clip (e.g., voiceprint) for audio quality, or an improved video quality scorer machine that automatically analyzes a video (e.g., with motion picture and audio) for visual quality, acoustic quality, or both.

As configured to perform one or more of the methodologies described herein, an image quality scorer machine accesses (e.g., receives or retrieves) a candidate image to be analyzed for visual quality. The candidate image may be or form all or part of a submission sent via one or more networks from a device of a user. The image quality scorer machine then generates a visual quality score of the candidate image, which may be performed by first generating a prediction of a similarity score for the candidate image. Specifically, the predicted similarly score of the candidate image may be generated by a process including inputting the candidate image into a neural network that has been trained to detect a set of image features in the candidate image and then to generate a corresponding predicted similarity score of the candidate image. The generation of the predicted similarity score by the trained neural network may be based on degrees to which the image features in the set are present in the candidate image.

After the predicted similarity score for the candidate image is generated, the image quality scorer machine derives the visual quality score for the candidate image based on the predicted similarity score outputted by the neural network. Accordingly, the image quality scorer machine may then provide or store the generated visual quality score of the candidate image for subsequent usage as a descriptor or other metadata indicator corresponding to the candidate image. For example, the generated visual quality score may be provided to a user via a graphical user interface on a device of the user, or to a software module executing on the image quality scorer machine or other machine.

One example embodiment provides a method comprising: accessing (e.g., receiving, reading, retrieving, or otherwise obtaining), via one or more computer networks, a candidate image to be analyzed for visual quality; generating, by one or more processors, a visual quality score of the candidate image, the generating of the visual quality score including: inputting the candidate image into a neural network trained to detect a set of image features in the candidate image and generate a corresponding predicted similarity score of the candidate image based on degrees to which image features in the set are present in the candidate image, the neural network being trained based on reference images and corresponding reference similarity scores that each quantifies similarity of a corresponding reference image to a corresponding verification image, the neural network outputting the predicted similarity score of the candidate image; and deriving the visual quality score of the candidate image based on the outputted predicted similarity score of the candidate image; and providing, by the one or more processors, the generated visual quality score of the candidate image. Thus, an improved runtime method for performing image quality assessment is provided. Details of additional example embodiments are discussed below.

Figure 1:
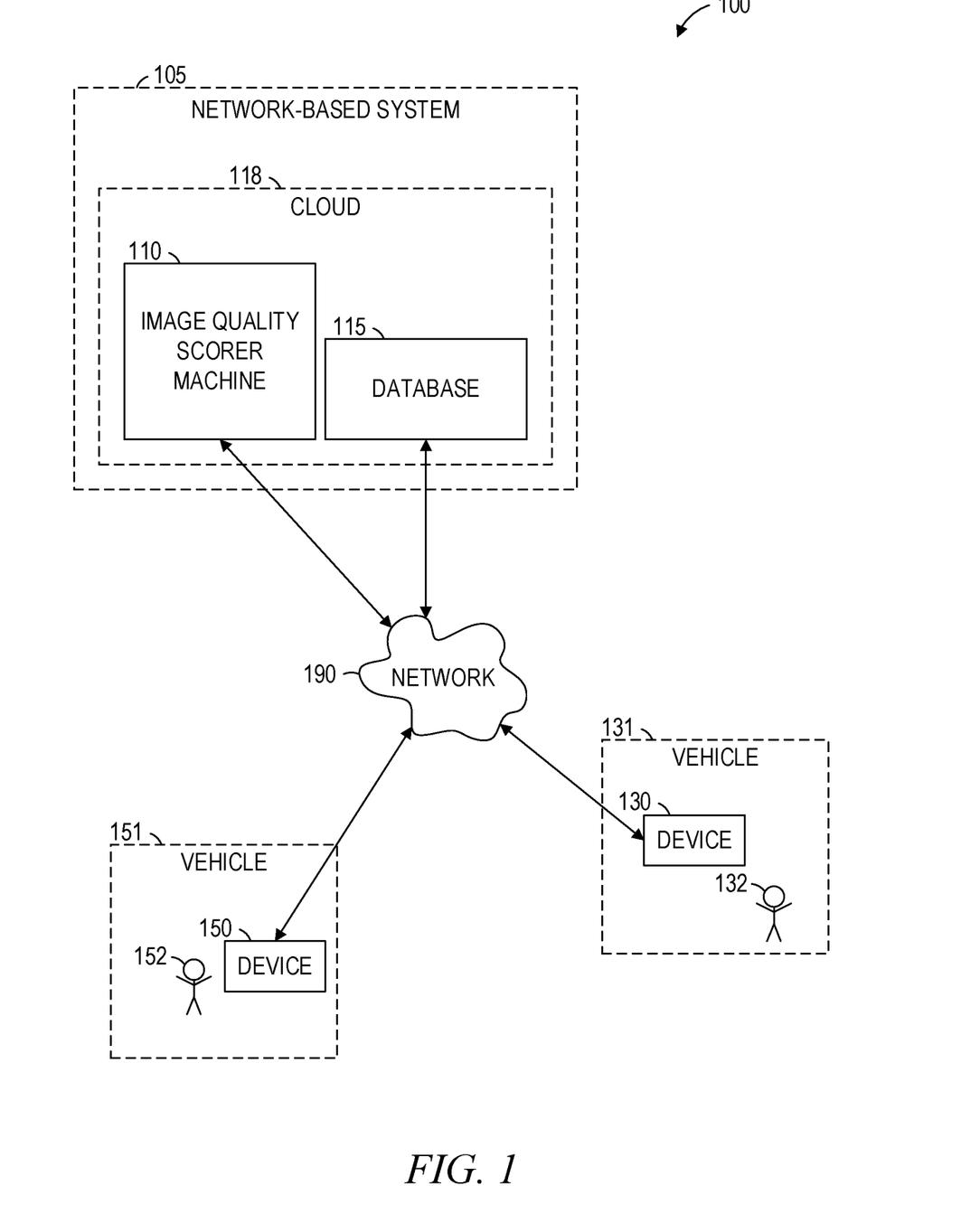
FIG. 1 is a network diagram illustrating a network environment suitable for operation of an image quality scorer machine, according to some example embodiments.

FIG. 1 is a network diagram illustrating a network environment 100, according to some example embodiments. The network environment 100 includes an image quality scorer machine 110, a database 115, and devices 130 and 150, which respectively may form all or part of vehicles 131 and 151, all communicatively coupled to each other via a network 190. The image quality scorer machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150, to their vehicles 131 and 151, or any suitable combination thereof). The image quality scorer machine 110 and the devices 130 and 150 may each be implemented in a special-purpose (e.g., specialized) computer system, in whole or in part, as described below with respect to FIG. 7.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 7, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
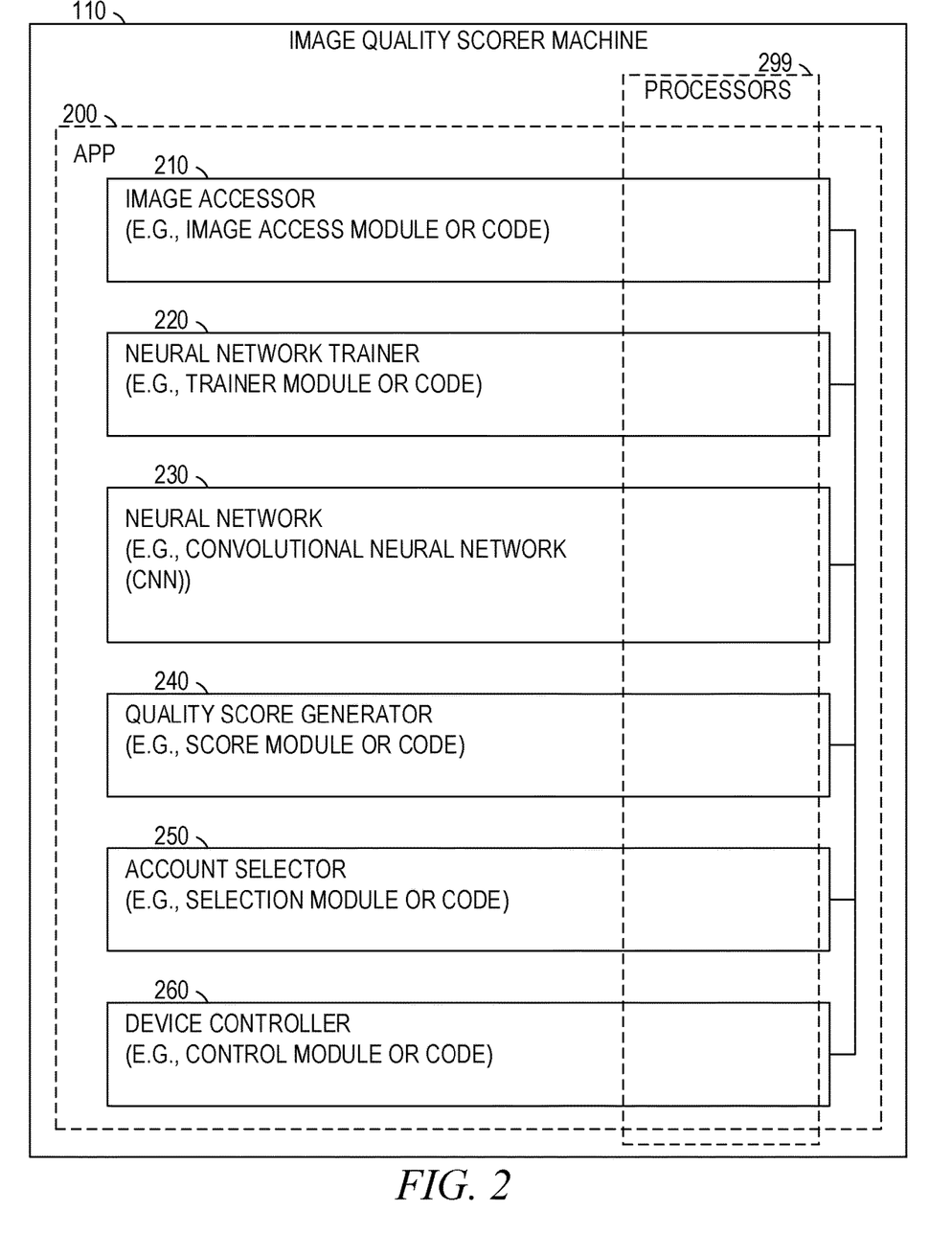
FIG. 2 is a block diagram illustrating components of an image quality scorer machine, according to some example embodiments.

FIG. 2 is a block diagram illustrating components of the image quality scorer machine 110, according to some example embodiments. The image quality scorer machine 110 is shown as including an image accessor 210, a neural network trainer 220, a neural network 230, a quality score generator 240, an account selector 250, and a device controller 260, all configured to communicate with each other (e.g., via a bus, shared memory, or a switch). In some example embodiments, these components are implemented across multiple machines (e.g., a first machine configured to train the neural network 230, a second machine configured to operate the quality score generator 240 based on the trained neural network 230, and a third machine configured to operate the account selector 250 and the device controller 260). However, for clarity and brevity, the present discussion focuses on example embodiments in which these components are present in the image quality scorer machine 110.

The image accessor 210 may be or include an image access module (e.g., configured to access one or more images as candidate images for visual quality analysis) or similarly suitable software code. The neural network trainer 220 may be or include a neural network trainer module (e.g., configured to train one or more neural networks using training data) or similar suitable software code. The neural network 230 may be or include a set of one or more neural networks, any one or more of which may be or include a convolutional neural network, or similarly suitable software code. The quality score generator 240 may be or include a score module (e.g., configured to derive or otherwise generate a quality score based on output from the neural network 230) or similarly suitable software code. The account selector 250 may be or include a selection module (e.g., configured to select or otherwise designate one or more user accounts as being selected) or similarly suitable software code. The device controller 260 may be or include a control module (e.g., configured to send one or more control commands to one or more devices, such as the devices 130 and 150) or similarly suitable software code.

As shown in FIG. 2, the image accessor 210, the neural network trainer 220, the neural network 230, the quality score generator 240, the account selector 250, and the device controller 260 may form all or part of an app 200 (e.g., a server app, a mobile app, or any suitable combination thereof) that is stored (e.g., installed) on the image quality scorer machine 110. Furthermore, one or more processors 299 (e.g., hardware processors, digital processors, or any suitable combination thereof) may be included (e.g., temporarily or permanently) in the app 200, the image accessor 210, the neural network trainer 220, the neural network 230, the quality score generator 240, the account selector 250, the device controller 260, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 3:
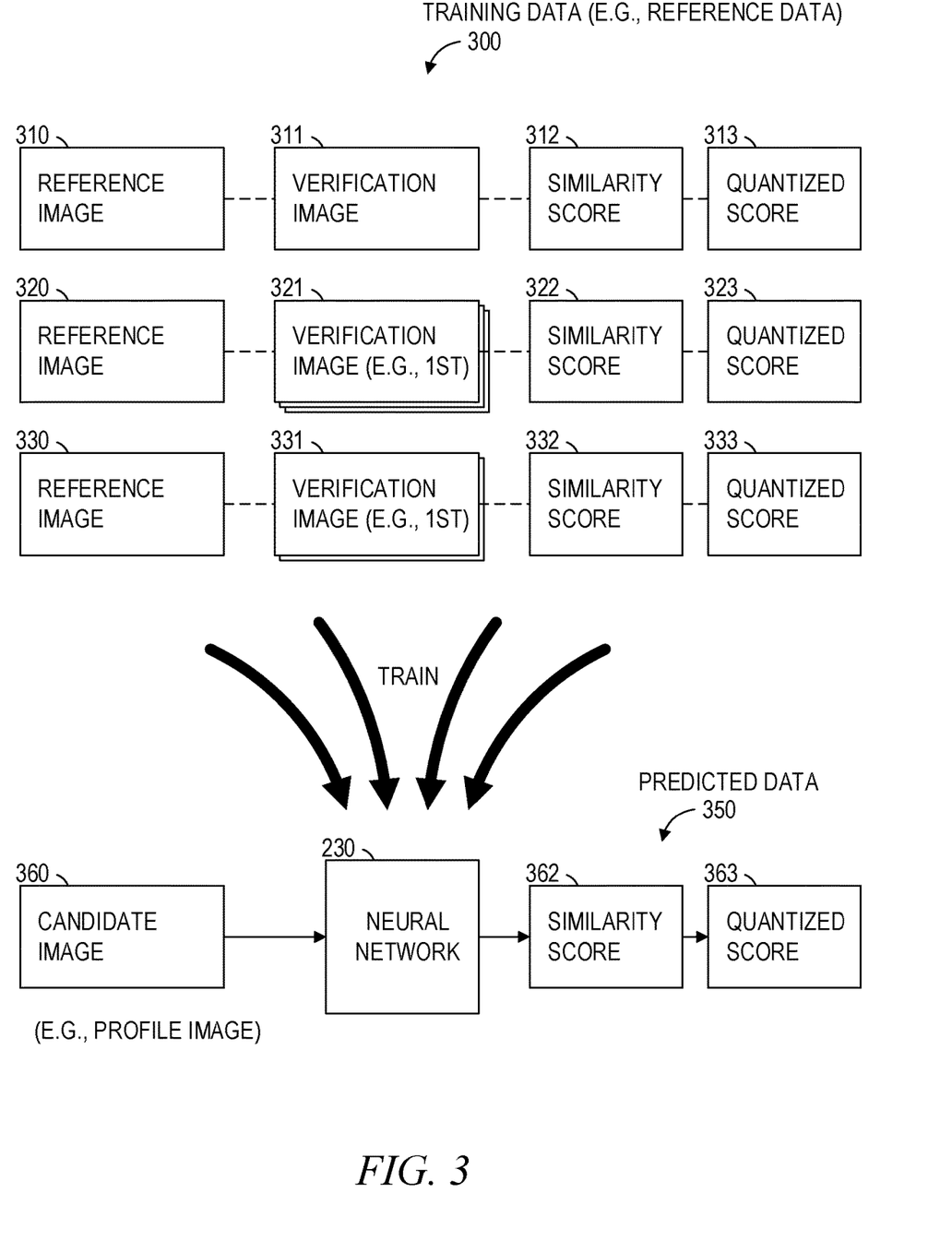
FIG. 3 is a block diagram illustrating training and usage of a neural network suitable for inclusion in the image quality scorer machine, according to some example embodiments.

FIG. 3 is a block diagram illustrating training and usage of the neural network 230 suitable for inclusion in the image quality scorer machine, according to some example embodiments. Prior to runtime usage, the neural network 230 is first prepared by being trained based on training data 300 (e.g., reference data), which may be stored in the database 115 and accessed therefrom. The training data 300 includes reference images 310, 320, and 330 and corresponding verification images 311, 321, and 331, and may include corresponding similarity scores 312, 322, and 332, corresponding quantized similarity scores 313, 323, and 333, or both.

The correspondence relationships are shown in FIG. 3 with dashed lines. Accordingly, the reference image 310 corresponds to the verification image 311, which may be a first (as in earliest) verification image among a sequence of verification images that all correspond to the reference image 310. The reference image 310 and the verification image 311 both correspond to the similarity score 312 and the quantized similarity score 313. Similarly, the reference image 320 corresponds to the verification image 321 (e.g., a first or earliest verification image among the sequence of verification images that all correspond to the reference image 320. The reference image 320 and the verification image 321 both correspond to the similarity score 322 and the quantized similarity score 323. Likewise, the reference image 330 corresponds to the verification image 331 (e.g., a first or earliest verification image among the sequence of verification images that all correspond to the reference image 330. The reference image 330 and the verification image 331 both correspond to the similarity score 332 and the quantized similarity score 333.

In preparing the training data 300, each similarity score (e.g., similarity score 312), quantized similarity score (e.g., quantized similarity score 313), or any suitable combination thereof, was generated by comparing the corresponding reference image (e.g., reference image 310) to the corresponding verification image (e.g., verification image 311). Such comparisons may have been performed by inputting both the reference image and the verification image into an image comparison engine and storing the output thereof (e.g., in the database 115). However, in some example embodiments, one or more similarity scores or quantized similarity scores were generated or modified by human input (e.g., by an administrator of the image quality scorer machine 110).

As shown by heavy arrows in FIG. 3, the training data 300 is used to train the neural network 230 (e.g., a convolutional neural network). In particular, the neural network 230 becomes trained to detect a set of one or more image features in the input image and then generate a corresponding predicted similarity score for the input image, based on a degree to which the image features in the set are present in the input image. More specifically, the neural network 230 learns which image features present in the reference images (e.g., reference images 310, 320, and 330) are strongly correlated with various similarity scores (e.g., similarity scores 312, 322, and 332), various quantized similarity scores (e.g., quantized similarity scores 313, 323, and 333, which may represent various ranges of similarity scores), or both.

Accordingly, the neural network 230 is trained to identify the set of image features appearing in the reference images and then, for each image feature in the set, determine a corresponding scalar weight of that image feature in influencing the corresponding similarity scores. Determination (e.g., convergence) of these scalar weights results in the neural network 230 becoming trained to predict similarity scores for input images (e.g., candidate images) without any corresponding verification images. That is, the predicted similarity score represents a prediction of what the similarity score would be if the input image were to be compared against a hypothetical (e.g., potentially nonexistent) verification image, in the manner used to compare the reference images to their corresponding verification images.

As noted above, after the neural network 230 has been trained based on the training data 300, the neural network 230 is configured to predict a similarity score given any input image. Thus, as shown in FIG. 3, a candidate image 360 (e.g., a profile image, such as a user profile image that depicts a human face of a registered person having a corresponding user account) can be input into the trained neural network 230, and the trained neural network 230 is configured to output predicted data 350 that includes a predicted similarity score 362, a quantized similarity score 363, or both. Some or all of the predicted data 350 may be used by the image quality scorer machine 110, communicated therefrom (e.g., to the device 130), or stored for later use (e.g., in the database 115).

In accordance with the systems and methodologies described herein, a predicted similarity score (e.g., similarity score 362 or quantized similarity score 363) is usable as an indicator of visual quality in the corresponding input image (e.g., candidate image 360). That is, the predicted similarity score can be used as a visual quality score of the input image or a basis (e.g., an intermediate visual quality score) for deriving a visual quality score of the input image.

This is because, within the training data 300, each similarity score (e.g., similarity score 312) represents (e.g., quantifies) the similarity of a reference image (e.g., reference image 310) to its corresponding verification image (e.g., verification image 311), and this similarity between the two images may have been quantified by image comparison engine that generated the similarity score as an output of comparing the two images. In this context, the following reasons for a low similarity score are contemplated: (1) the reference image has low visual quality; (2) the verification image has low visual quality; (3) the reference and verification images depict faces of different people; and (4) the image comparison engine is flawed. The systems and methodologies described herein focus on the first reason and treat the remaining three reasons as negligible for practical purposes (e.g., sufficiently infrequently encountered, addressable by other techniques, or both). Accordingly, by training the neural network 230 to detect those image features that, when present in a reference image, are likely to ultimately result in a low similarity score, the trained neural network 230 can then be incorporated into the image scorer machine 110 and used therein to assess an input image (e.g., candidate image 360) for visual quality, even when there is no corresponding verification image to compare against the input image.

Figure 4:
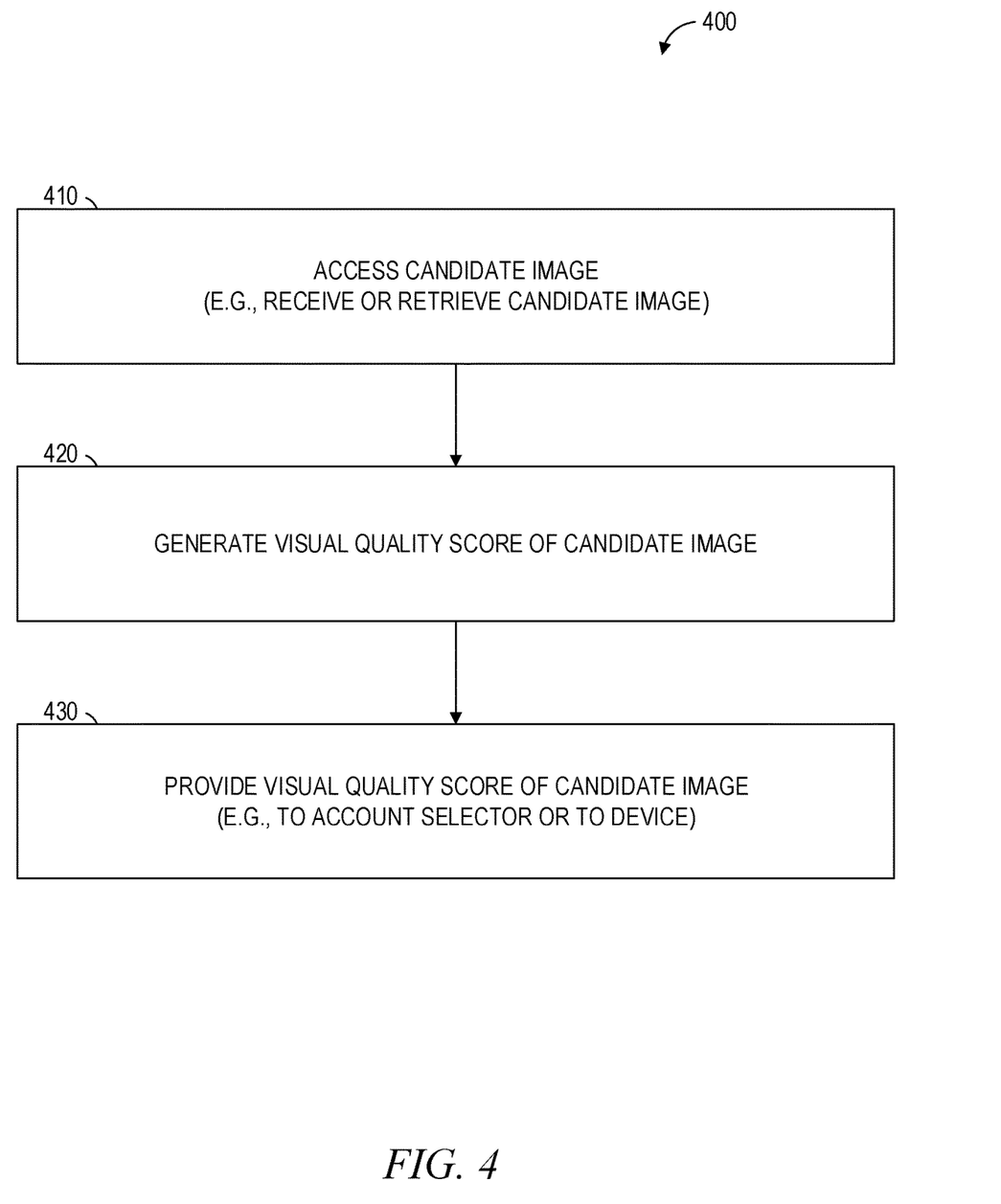
FIGS. 4-6 are flowcharts illustrating operations of the image quality scorer machine in performing a method of generating a visual quality score for a candidate image, according to some example embodiments.
Figure 5:
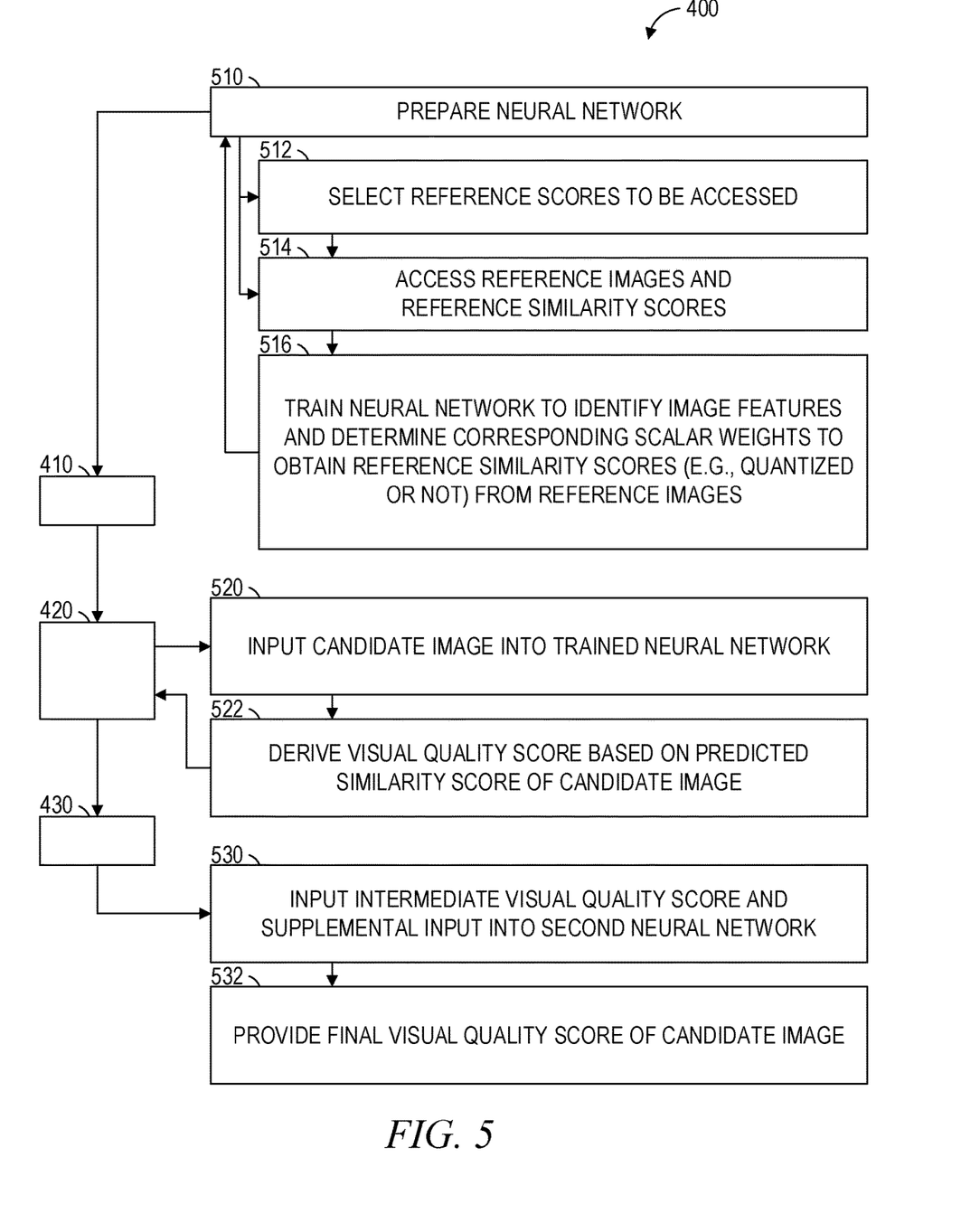
Figure 6:
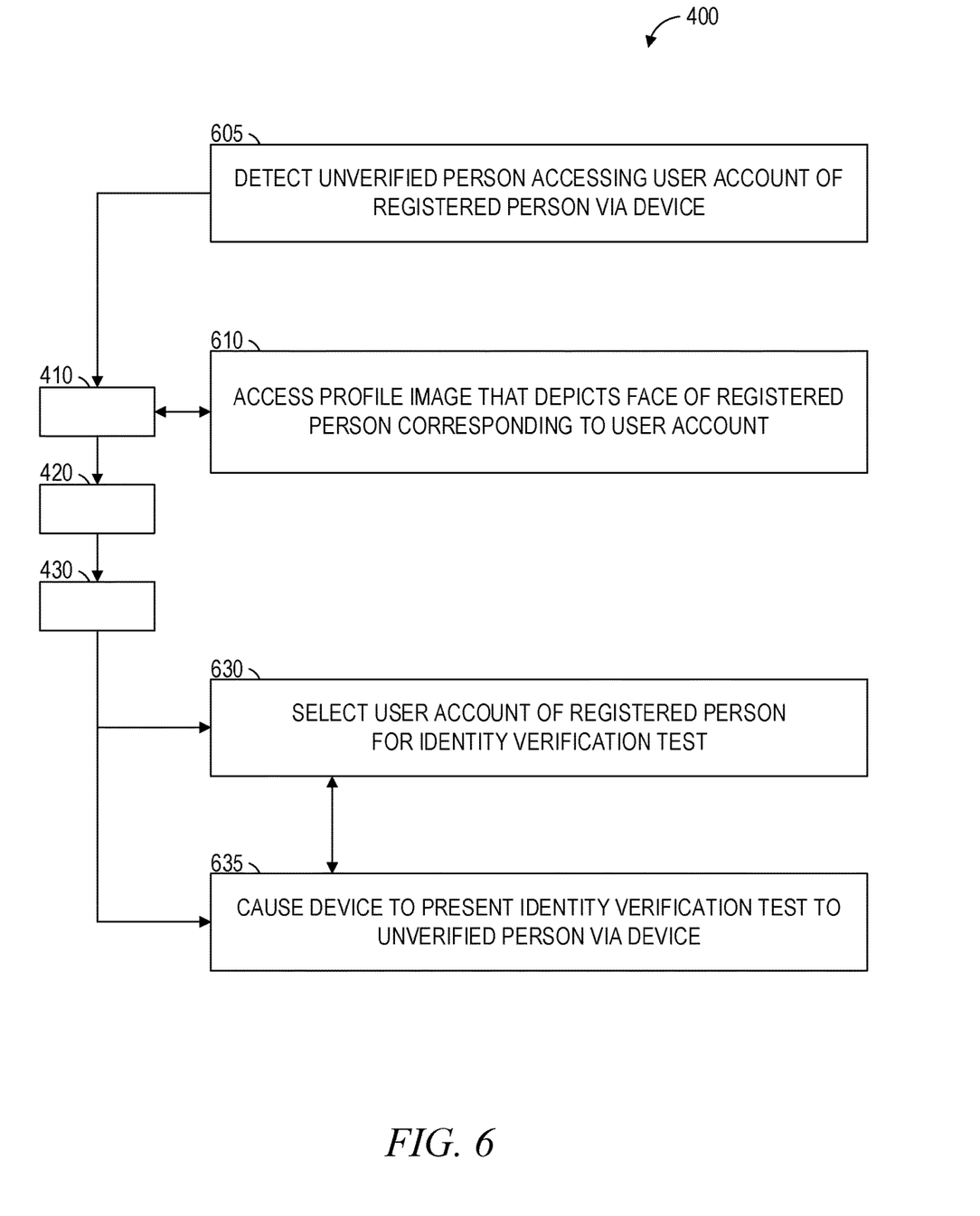

FIGS. 4-6 are flowcharts illustrating operations of the image quality scorer machine 110 in performing a method 400 of generating a visual quality score for the candidate image 360 (e.g., similarity score 362, quantized similarity score 363, or a visual quality score derived therefrom), according to some example embodiments. Operations in the method 400 may be performed using components (e.g., modules) described above with respect to FIG. 2, using one or more processors (e.g., microprocessors or other hardware processors), or using any suitable combination thereof. As shown in FIG. 4, the method 400 includes operations 410, 420, and 430.

In operation 410, the image accessor 210 accesses the candidate image 360 to be analyzed for visual quality. For example, the candidate image 360 may be accessed from the database 115, from internal storage at the image quality scorer machine 110, from the device 130, or from another data resource accessible via the network 190. The accessing of the candidate image 360 may include receiving the candidate image 360 (e.g., as a submission from the device 130) or retrieving the candidate image 360 (e.g., from the database 115) for visual quality analysis (e.g., in response to a command, request, flag, or other indication that the candidate image 360 is selected for visual quality analysis).

In operation 420, the quality score generator 240 generates the visual quality score for the candidate image 360. This may be performed all or in part by processing the candidate image 360 with the trained neural network 230, which may be a convolutional neural network and may be trained in a manner described above with respect to FIG. 3. Further details of operation 420 are described below with respect to FIG. 5.

In operation 430, the quality score generator 240 provides the generated visual quality score of the candidate image 360 for subsequent usage. For example, the visual quality score may be provided (e.g., by communication via the network 190) to the account selector 250 (e.g., for use in selecting a user account for one or more actions thereupon), to the device 130 (e.g., for use in interacting with the user 132 via graphical user interface, such as presenting, invoking, or initiating an identity verification test), to the database 115 (e.g., for storage), or to any suitable combination thereof.

As shown in FIG. 5, in addition to any one or more the operations previously described, the method 400 may include one or more of operations 510, 512, 514, 516, 520, 522, 530, and 532. Operation 510 may be performed prior to operation 410, in which the image accessor 210 accesses the candidate image 360. In operation 510, the neural network trainer 220 prepares the neural network 230 by training the neural network 230. This may be performed in a manner as described above with respect to FIG. 3. Furthermore, one or more of operations 512, 514, and 516 may be performed as part (e.g., a precursor task, a subroutine, or a portion) of operation 510.

In operation 512, the neural network trainer 220 selects the reference similarity scores to be accessed and used for training the neural network 230. The selected reference similarity scores (e.g., similarity scores 312, 322, and 332) may be a subset of all reference similarity scores available for selection within the training data 300. According to some example embodiments, the selection of each reference similarity score (e.g., similarity score 322) is based on whether the corresponding verification image (e.g., verification image 321) is a first (as in chronologically earliest) submitted verification image (e.g., as indicated by a corresponding timestamp or other suitable metadata) among the sequence of verification images that correspond to the reference image (e.g., reference image 320) compared against that verification image to obtain that reference similarity score. Thus, for example, the training of the neural network 230 can be focused on using only the first verification images provided (e.g., uploaded) by registered users after providing their profile images (e.g., to avoid using subsequent attempts to submit verification images that better match their respectively corresponding profile images).

In operation 514, the neural network trainer 220 accesses the reference images (e.g., reference images 310, 320, and 330) that correspond to the reference similarity scores (e.g., similarity scores 312, 322, and 332) that were selected in operation 512. As noted above, each of these reference similarity scores (e.g., similarity score 332) was generated by comparing its corresponding reference image (e.g., reference image 330) with a corresponding verification image (e.g., verification image 331). However, in some example embodiments, one or more of these reference similarity scores was generated or modified by human input (e.g., by an administrator of the image quality scorer machine 110). The neural network trainer 220 also accesses the corresponding reference similarity scores (e.g., similarity scores 312, 322, and 332) in response to their selection in operation 512.

In operation 516, the neural network trainer 220 trains the neural network 230 to identify a set of one or more image features appearing in or otherwise exhibited by the reference images accessed in operation 514 (e.g., reference images 310, 320, and 330). Furthermore, for each image feature in the identified set, the neural network trainer 220 determines a corresponding scalar weight of that image feature in influencing the corresponding reference similarity scores (e.g., similarity scores 312, 322, and 332) selected in operation 512 and accessed in operation 514. As a result, the neural network trainer 220 trains the neural network 230 to output a predicted similarity score (e.g., similarity score 362 for the candidate image 360) for an input image based on degrees to which the one or more image features in the identified set are present in the input image (e.g., candidate image 360), where the degrees to which the one or more image features are present in the input image are weighted by the corresponding determined scalar weights.

In some example embodiments, the use of quantized similarity scores (e.g., quantize similarity scores 313, 323, and 333) is helpful to limit or optimize the number of distinct similarity scores to be processed. In such example embodiments, performance of operation 510 may include quantizing the reference similarity scores (e.g., similarity scores 312, 322, and 332) into a plurality of ranges that are each represented by a different reference quantized similarity score (e.g., quantized similarity scores 313, 323, 333). Accordingly, performance of operation 512 selects reference quantized similarity scores to be accessed and used for training the neural network 230. The selected reference quantized similarity scores (e.g., quantize similarity scores 313, 323, and 333) are used in place of the aforementioned non-quantized reference similarity scores (e.g., similarity scores 312, 322, and 332). Similarly, performance of operation 514 includes accessing the reference images (e.g., reference images 310, 320, and 330) that correspond to the reference quantized similarity scores (e.g., quantize similarly scores 313, 323, and 333) that were selected in operation 512. Likewise, performance of operation 516 trains the neural network 230 to output a predicted similarity score for an input image by outputting a predicted quantized similarity score (e.g., quantized similarity score 363 for the candidate image 360). The predicted quantized similarity score indicates which range, among the plurality of ranges, corresponds to the input image (e.g., candidate image 360).

As shown in FIG. 5, one or more of operations 520 and 522 may be performed as part of operation 420 in which the quality score generator 240 generates the visual quality score for the candidate image 360. In operation 520, the quality score generator 240 inputs the candidate image 360 into the trained neural network 230 and obtains output therefrom. Accordingly, the trained neural network 230 takes the candidate image 360 as input and generates a corresponding predicted similarity score (e.g., similarity score 362 or quantized similarity score 363) of the candidate image 360 as output. As noted above, the trained neural network 230 is trained based on reference images (e.g., reference images 310, 320, and 330) and respectively corresponding reference similarity scores (e.g., similarity scores 312, 322, and 332) that each quantifies similarity over corresponding reference image (e.g., reference image 310) to a corresponding verification image (e.g., verification image 311). Furthermore, the predicted similarity score of the candidate image 360 is generated based on degrees to which one or more image features in a set of one or more image features are present in (e.g., exhibited by) the candidate image 360. Accordingly, the trained neural network 230 outputs the predicted similarity score of the candidate image 360.

In operation 522, the quality score generator 240 generates (e.g., calculates or otherwise derives) the visual quality score for the candidate image 360 based on the output of the trained neural network 230 from operation 520. In some example embodiments, the predicted similarity score (e.g., similarity score 362 or quantized similarity score 363) outputted by the trained neural network 360 is equated to the visual quality score of the candidate image 360. In alternative example embodiments, the predicted similarity score outputted by the trained neural network 360 is an intermediate (e.g., interim) visual quality score and thereafter modified by the quality score generator 240 based on one or more additional factors to generate a final (e.g., ultimate) visual quality score of the candidate image 360.

As shown in FIG. 5, according to some example embodiments, one or more of operations 530 and 532 may be performed at any point after operation 420 (e.g., before or after operation 430). In operation 530, the quality score generator 240 provides the output of operation 420 (e.g., the output of operation 522, which may be the similarity score 362 or the quantized similarity score 363, for the candidate image 360) and at least one supplemental as input into a further (e.g., second) neural network and obtains an output therefrom. In such example embodiments, the trained neural network 230 may be considered as a first neural network for preliminary processing, and the further neural network may be considered as a second neural network for further processing. Accordingly, the visual quality score of the candidate image 360, as generated in operation 420, may be considered as an intermediate visual quality score of the candidate image 360. The further neural network (e.g., second neural network) may be trained to output a final visual quality score of the candidate image 360 based on this intermediate visual quality score and the at least one supplemental input.

In some example embodiments, one of the one or more supplemental inputs to the further (e.g., second) neural network indicates an attribute (e.g., age, sex, etc.) of the human face depicted by the candidate image 360. For example, in example embodiments where the attribute is an age of the human face, such a supplemental input may be determined (e.g., generated, selected, or retrieved) by a suitable age estimation engine based on the candidate image 360. In such situations, the further neural network is trained to output the final visual quality score of the candidate image 360 based on intermediate visual quality score and the indicated age of the human face depicted by the candidate image 360. Similarly, in example embodiments where the attribute is a sex or gender of the human face, such a supplemental input may be determined by a suitable sex or gender estimation engine based on the candidate image 360, and the further neural network is trained to output the final visual quality score of the candidate image 360 based on the intermediate visual quality score and the indicated sex or gender of the human face.

In certain example embodiments, one of the one or more supplemental inputs to the further (e.g., second) neural network indicates a ratio of the age (e.g., first age) of the human face depicted by the candidate image 360 to the age (e.g., second age) of the human face depicted in a further (e.g., earlier taken or later taken) image. Such a supplemental input may be determined (e.g., generated, selected, or retrieved) by a suitable age estimation engine based on the candidate image 360 and the further image. In such situations, the further neural network is trained to output the final visual quality score of the candidate image 360 based on the intermediate visual quality score and the indicated ratio (e.g., the age ratio between the candidate image 360 and a further image, which may also be called the ratio between the first and second ages of the human face depicted in the candidate image 360).

In various example embodiments, one of the one or more supplemental inputs to the further (e.g., second) neural network indicates an amount of tilt exhibited by a human head depicted by the candidate image 360. Such a supplemental input may be determined (e.g., generated, selected, or retrieved) by a suitable head recognition engine based on the candidate image 360. In such situations, the further neural network is trained to output the final visual quality score of the candidate image 360 based on the intermediate visual quality score and the indicated amount of tilt (e.g., head tilt) exhibited by the human head depicted by the candidate image 360.

In some example embodiments, one of the one or more supplemental inputs to the further (e.g., second) neural network indicates an amount of yaw exhibited by a human head depicted by the candidate image 360. Such a supplemental input may be determined (e.g., generated, selected, or retrieved) by a suitable head recognition engine based on the candidate image 360. In such situations, the further neural network is trained to output the final visual quality score of the candidate image 360 based on the intermediate visual quality score and the indicated amount of yaw (e.g., head yaw) exhibited by the human head depicted by the candidate image 360.

In certain example embodiments, one of the one or more supplemental inputs to the further (e.g., second) neural network indicates a proportional area with which the candidate image 360 depicts a human face. Such a supplemental input may be determined (e.g., generated, selected, or retrieved) by a suitable face recognition engine based on the candidate image 360. In such situations, the further neural network is trained to output the final visual quality score of the candidate image 360 based on the intermediate visual quality score and the indicated proportional area (e.g., face proportion or face percentage) with which the candidate image 360 depicts the human face.

According to various example embodiments, additional examples of the supplemental inputs to the further (e.g., second) neural network include a geographic location at which the candidate image 360 was taken (e.g., as indicated by included metadata), a geographic region in which the candidate image 360 was taken (e.g., as indicated by included metadata), a camera type used to take the candidate image 360 (e.g., as indicated by included metadata), whether the candidate image 360 was taken indoors or outdoors (e.g., as indicated by included metadata or detected by image analysis), whether the candidate image 360 was taken inside a vehicle (e.g., as indicated by included metadata or detected by image analysis), the time of day at which the candidate image 360 was taken (e.g., as indicated by included metadata or detected by image analysis), the color temperature of lighting or a range thereof (e.g., sunlight, fluorescent light, or candlelight) depicted in the candidate image 360 (e.g., as indicated by included metadata or detected by image analysis), or any suitable combination thereof.

According to some example embodiments, other examples of the supplemental inputs to the further (e.g., second) neural network include image brightness (e.g., as indicated by included metadata or detected by image analysis), image blurriness (e.g., as indicated by included metadata or detected by image analysis), a histogram of colors (e.g., represented by frequency data or wavelength data) present in the candidate image 360 (e.g., as indicated by included metadata or detected by image analysis), or any suitable combination thereof.

In operation 532, the quality score generator 240 provides the generated final visual quality score of the candidate image 360 for subsequent usage. For example, the final visual quality score may be provided (e.g., by communication via the network 190) to the account selector 250 (e.g., for use in selecting a user account for one or more actions thereupon), to the device 130 (e.g., for use in interacting with the user 132, such as presenting an identity verification test), to the database 115 (e.g., for storage), or to any suitable combination thereof.

As shown in FIG. 6, in addition to any one or more of the operations previously described, the method 400 may include one or more of operations 605, 610, 630, and 635. Such example embodiments may be useful in situations where all or part of the network-based system 105 is tasked with automatically determining whether to initiate an identity verification test to verify the identity of a person.

Operation 610 may be performed as part of operation 410, in which the image accessor 210 accesses (e.g., receives) the candidate image 360. In operation 610, the candidate image 360 is a profile image (e.g., user profile image) that depicts a human face of a registered person who has a corresponding user account and is represented by a corresponding user profile that includes the profile image, and the image accessor 210 accesses the profile image as the candidate image 360.

Operation 630 may be performed at any point after operation 420 (e.g., before operation 430, during operation 430, or after operation 430 as illustrated). In operation 630, the account selector 250 selects the user account of the registered person for an identity verification test, and this selection may be based on the visual quality score of the profile image (e.g., candidate image 360). Such an identity verification test may ask for submission of some indicator (e.g., selfie photograph, voice print, or fingerprint) of a person's identity and test the received submission to determine who submitted the indicator. The visual quality score may be an intermediate visual quality score (e.g., resulting from performance of operation 420) or a final visual quality score (e.g., resulting from performance of operation 420 or operation 530).

In certain example embodiments, operation 605 may be performed prior to operation 410, in which the image accessor 210 accesses the candidate image 360. In operation 605, the device controller 260 detects that an unverified person (e.g., user 132) is accessing the user account of the registered person (e.g., user 152) via a device (e.g., device 130). For example, the device controller 260 may detect one or more anomalous conditions while the user account of the registered person is being accessed. As another example, the device controller 260 may deem any access of the user accounts to be from an unverified person until that person has been verified. In such example embodiments, the selecting of the user account for the identity verification test in operation 630 may be based on this detection that an unverified person is accessing the user account.

Accordingly, in operation 635, the device controller 260 causes the device (e.g., device 130) to present the identity verification test to the unverified person (e.g., user 132). For example, the device controller 260 may send one or more commands (e.g., via the network 190) that cause an app executing on the device to initiate a presentation of the identity verification test. Performance of operation 635 may be based on the detection in operation 605 that the unverified person is accessing the user profile.

According to various example embodiments, one or more of the methodologies described herein may facilitate improved ways to automatically assess visual or acoustic quality of media content, including user profile images, user fingerprint images, and user voiceprints. Moreover, one or more of the methodologies described herein may facilitate the training and usage of a neural network to provide visual or acoustic quality scores based on predictions of similarity scores. Hence, one or more of the methodologies described herein may facilitate automated media quality analysis and initiation of actions in response thereto, including automation of identity verification tests, compared to capabilities of pre-existing systems and methods.

When these effects are considered in aggregate, one or more of the methodologies described herein may obviate a need for certain efforts or resources that otherwise would be involved in media quality analysis. Efforts expended by a user in performing media quality analysis and taking actions in response thereto may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 7:
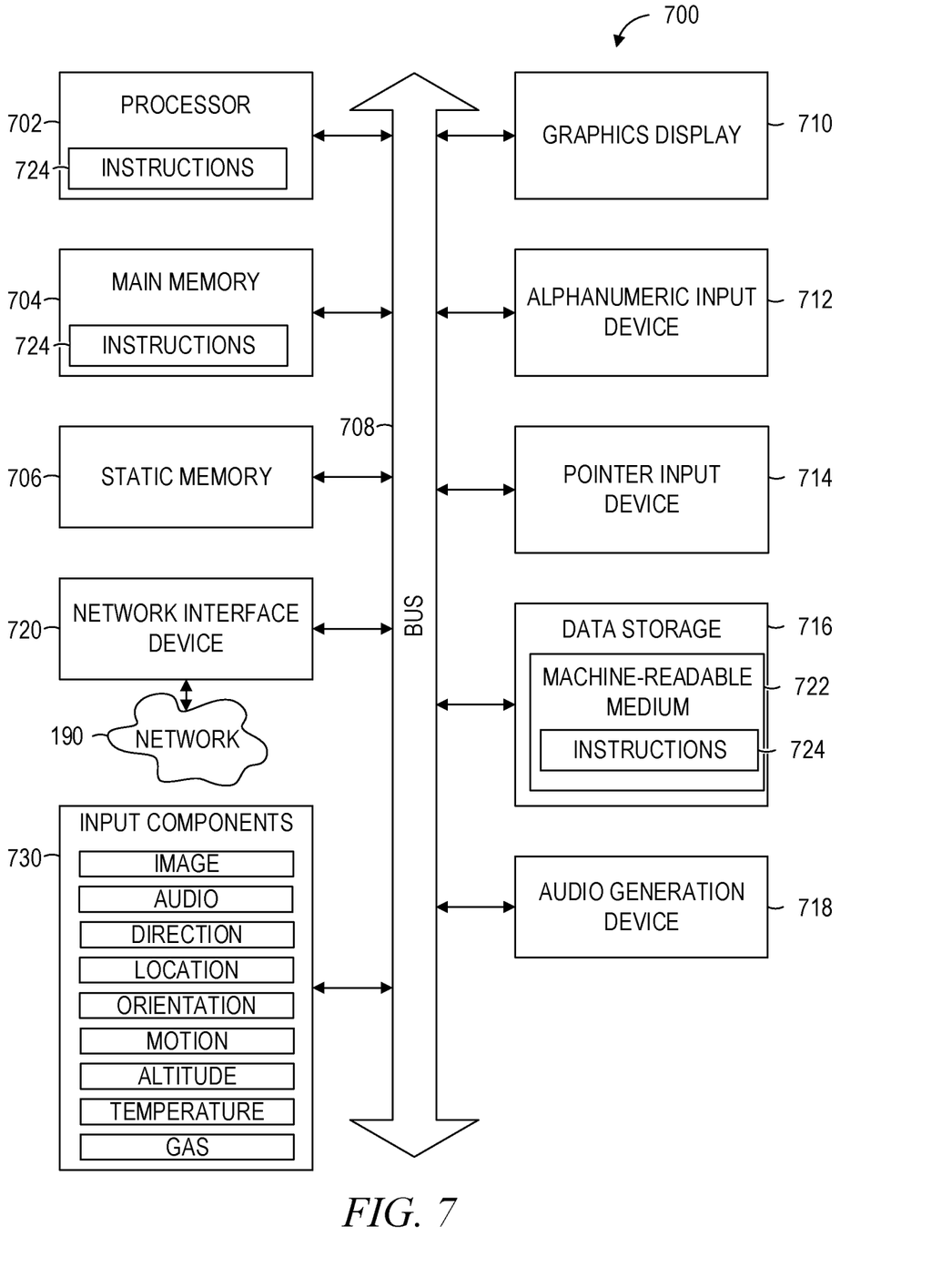
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions 724 from a machine-readable medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer system (e.g., a computer) within which the instructions 724 (e.g., software, a program, an application, an applet, an app, or other executable code) for causing the machine 700 to perform any one or more of the methodologies discussed herein may be executed, in whole or in part.

In alternative embodiments, the machine 700 operates as a standalone device or may be communicatively coupled (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include any collection of machines that individually or jointly execute the instructions 724 to perform all or part of any one or more of the methodologies discussed herein.

The machine 700 includes a processor 702 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 704, and a static memory 706, which are configured to communicate with each other via a bus 708. The processor 702 contains solid-state digital microcircuits (e.g., electronic, optical, or both) that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein. In some example embodiments, the processor 702 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 700 with at least the processor 702, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 700 may further include a graphics display 710 (e.g., a plasma display panel (PDP), a light emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a pointer input device 714 (e.g., a mouse, a touchpad, a touchscreen, a trackball, a joystick, a stylus, a motion sensor, an eye tracking device, a data glove, or other pointing instrument), a data storage 716, an audio generation device 718 (e.g., a sound card, an amplifier, a speaker, a headphone jack, or any suitable combination thereof), and a network interface device 720.

The data storage 716 (e.g., a data storage device) includes the machine-readable medium 722 (e.g., a tangible and non-transitory machine-readable storage medium) on which are stored the instructions 724 embodying any one or more of the methodologies or functions described herein. The instructions 724 may also reside, completely or at least partially, within the main memory 704, within the static memory 706, within the processor 702 (e.g., within the processor's cache memory), or any suitable combination thereof, before or during execution thereof by the machine 700. Accordingly, the main memory 704, the static memory 706, and the processor 702 may be considered machine-readable media (e.g., tangible and non-transitory machine-readable media). The instructions 724 may be transmitted or received over the network 190 via the network interface device 720. For example, the network interface device 720 may communicate the instructions 724 using any one or more transfer protocols (e.g., hypertext transfer protocol (HTTP)).

In some example embodiments, the machine 700 may be a portable computing device (e.g., a smart phone, a tablet computer, or a wearable device), and may have one or more additional input components 730 (e.g., sensors or gauges). Examples of such input components 730 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 724 for execution by the machine 700, such that the instructions 724, when executed by one or more processors of the machine 700 (e.g., processor 702), cause the machine 700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 724 for execution by the machine 700 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 724).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The various example embodiments of methods, machine-readable media, and systems (e.g., machines, devices, or other apparatus) discussed herein refer to systems and methodologies for performing image quality assessment (e.g., image quality scoring) for profile images. Analogous systems and methodologies can perform analogous assessments of quality, such as image quality assessment for fingerprint images, audio quality assessment (e.g., audio quality scoring for audio content, such as voiceprints), video quality assessment (e.g., video quality scoring for video content), or any suitable combination thereof.

What is claimed is:

1. A method comprising:
   preparing a neural network for receiving a candidate image to be analyzed for visual quality, the preparing of the neural network including:
      selecting reference similarity scores that were each generated by comparing a corresponding reference image with a corresponding verification image, the selecting of each reference similarity score being based on whether its corresponding verification image is an earliest verification image among a sequence of verification images that correspond to the reference image for that reference similarity score;
      accessing the selected reference similarity scores and their corresponding reference images; and
      training the neural network to identify a set of image features in the reference images and, for each image feature in the set, determine a corresponding scalar weight of that image feature for influencing the reference similarity scores;
   receiving, via one or more computer networks, the candidate image;
   generating, by one or more processors, a visual quality score of the candidate image, the generating of the visual quality score including:
      inputting the candidate image into the neural network trained to detect the set of image features in the candidate image and generate a corresponding predicted similarity score of the candidate image based on degrees to which image features in the set are present in the candidate image, the neural network outputting the predicted similarity score of the candidate image; and
      deriving the visual quality score of the candidate image based on the outputted predicted similarity score of the candidate image; and
   providing, by the one or more processors, the generated visual quality score of the candidate image.

2. The method of claim 1, wherein:
   the preparing of the neural network further includes quantizing the reference similarity scores into a plurality of ranges;

the training of the neural network trains the neural network to output the predicted similarity score by outputting a quantized similarity score that indicates a range among the plurality of ranges; and
the generated visual quality score of the candidate image indicates the range among the plurality of ranges.

3. The method of claim 1, wherein:
the candidate image has no corresponding verification image; and
the generating of the visual quality score of the candidate image is uninfluenced by any corresponding verification image.

4. The method of claim 1, wherein:
the neural network is a first neural network;
the generated visual quality score of the candidate image is an intermediate visual quality score of the candidate image; and
the method further comprises:
inputting the intermediate visual quality score of the candidate image and a supplemental input into a second neural network trained to output a final visual quality score of the candidate image based on the intermediate visual quality score and the supplemental input; and
providing the outputted final visual quality score of the candidate image.

5. The method of claim 4, wherein:
the supplemental input indicates an age of a human face depicted by the candidate image; and
the second neural network is trained to output the final visual quality score of the candidate image based on the intermediate visual quality score of the candidate image and the indicated age of the human face depicted by the candidate image.

6. The method of claim 4, wherein:
the supplemental input indicates a ratio between a first age of a human face depicted by the candidate image and a second age of the human face depicted in a further image; and
the second neural network is trained to output the final visual quality score of the candidate image based on the intermediate visual quality score of the candidate image and the indicated ratio between the first and second ages of the human face.

7. The method of claim 4, wherein:
the supplemental input indicates an amount of tilt exhibited by a human head depicted by the candidate image; and
the second neural network is trained to output the final visual quality score of the candidate image based on the intermediate visual quality score of the candidate image and the indicated amount of tilt exhibited by the human head depicted by the candidate image.

8. The method of claim 4, wherein:
the supplemental input indicates an amount of yaw exhibited by a human head depicted by the candidate image; and
the second neural network is trained to output the final visual quality score of the candidate image based on the intermediate visual quality score of the candidate image and the indicated amount of yaw exhibited by the human head depicted by the candidate image.

9. The method of claim 4, wherein:
the supplemental input indicates a proportional area with which the candidate image depicts a human face; and
the second neural network is trained to output the final visual quality score of the candidate image based on the intermediate visual quality score of the candidate image and the indicated proportional area with which the candidate image depicts the human face.

10. The method of claim 1, wherein:
the receiving of the candidate image includes receiving a profile image that depicts a face of a registered person having a corresponding user account and represented by a corresponding user profile that includes the profile image; and
the method further comprises:
selecting the user account of the registered person for an identity verification test based on the generated visual quality score of the candidate image.

11. The method of claim 1, wherein:
the receiving of the candidate image includes receiving a profile image that depicts a face of a registered person having a corresponding user account and represented by a corresponding user profile that includes the profile image; and
the method further comprises:
detecting that an unverified person is accessing the user account of the registered person via a device; and
causing the device to present an identity verification test to the unverified person based on the generated visual quality score of the candidate image.

12. A non-transitory machine-readable storage medium comprising instructions that, when executed by one or more processors of a machine, cause the machine to perform operations comprising:
preparing a neural network for receiving a candidate image to be analyzed for visual quality, the preparing of the neural network including:
selecting reference similarity scores that were each generated by comparing a corresponding reference image with a corresponding verification image, the selecting of each reference similarity score being based on whether its corresponding verification image is an earliest verification image among a sequence of verification images that correspond to the reference image for that reference similarity score;
accessing the selected reference similarity scores and their corresponding reference images; and
training the neural network to identify a set of image features in the reference images and, for each image feature in the set, determine a corresponding scalar weight of that image feature for influencing the reference similarity scores;
receiving the candidate image to be analyzed for visual quality;
generating a visual quality score of the candidate image, the generating of the visual quality score including:
inputting the candidate image into the neural network trained to detect the set of image features in the candidate image and generate a corresponding predicted similarity score of the candidate image based on degrees to which image features in the set are present in the candidate image, the neural network outputting the predicted similarity score of the candidate image; and
deriving the visual quality score of the candidate image based on the outputted predicted similarity score of the candidate image; and
providing the generated visual quality score of the candidate image.

13. The non-transitory machine-readable storage medium of claim 12, wherein:

the preparing of the neural network further includes quantizing the reference similarity scores into a plurality of ranges;

the training of the neural network trains the neural network to output the predicted similarity score by outputting a quantized similarity score that indicates a range among the plurality of ranges; and the generated visual quality score of the candidate image indicates the range among the plurality of ranges.

14. A system comprising:

one or more processors; and a memory storing instructions that, when executed by at least one processor among the one or more processors, cause the system to perform operations comprising:

preparing a neural network for receiving a candidate image to be analyzed for visual quality, the preparing of the neural network including:

selecting reference similarity scores that were each generated by comparing a corresponding reference image with a corresponding verification image, the selecting of each reference similarity score being based on whether its corresponding verification image is an earliest verification image among a sequence of verification images that correspond to the reference image for that reference similarity score;

accessing the selected reference similarity scores and their corresponding reference images; and training the neural network to identify a set of image features in the reference images and, for each image feature in the set, determine a corresponding scalar weight of that image feature for influencing the reference similarity scores;

receiving the candidate image to be analyzed for visual quality;

generating a visual quality score of the candidate image, the generating of the visual quality score including:

inputting the candidate image into the neural network trained to detect the set of image features in the candidate image and generate a corresponding predicted similarity score of the candidate image based on degrees to which image features in the set are present in the candidate image, the neural network outputting the predicted similarity score of the candidate image; and deriving the visual quality score of the candidate image based on the outputted predicted similarity score of the candidate image; and providing the generated visual quality score of the candidate image.

15. The system of claim 14, wherein:

the preparing of the neural network further includes quantizing the reference similarity scores into a plurality of ranges;

the training of the neural network trains the neural network to output the predicted similarity score by outputting a quantized similarity score that indicates a range among the plurality of ranges; and the generated visual quality score of the candidate image indicates the range among the plurality of ranges.

* * * * *